United States Patent
Muroyama et al.

(10) Patent No.: US 9,696,929 B2
(45) Date of Patent: Jul. 4, 2017

(54) STORAGE CONTROL APPARATUS AND COMPUTER-READABLE RECORDING MEDIUM STORING PROGRAM FOR REMOVING PREFETCHES TO STORAGE DEVICES CURRENTLY IN POWER-SAVING MODE

(71) Applicant: FUJITSU LIMITED, Kawasaki-shi, Kanagawa (JP)

(72) Inventors: Tomohiko Muroyama, Yokohama (JP); Tadashi Matsumura, Kawasaki (JP); Noriyuki Yasu, Kawasaki (JP); Motoki Sotani, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 14/946,615

(22) Filed: Nov. 19, 2015

(65) Prior Publication Data
US 2016/0210073 A1    Jul. 21, 2016

(30) Foreign Application Priority Data

Jan. 15, 2015  (JP) ................... 2015-006232

(51) Int. Cl.
*G06F 3/06*    (2006.01)
*G06F 12/08*   (2016.01)
*G06F 12/0831* (2016.01)

(52) U.S. Cl.
CPC ............ *G06F 3/0625* (2013.01); *G06F 3/061* (2013.01); *G06F 3/0656* (2013.01);
(Continued)

(58) Field of Classification Search
None
See application file for complete search history.

(56) References Cited

U.S. PATENT DOCUMENTS 5,860,083 A      1/1999 Sukegawa
2003/0126232 A1* 7/2003 Mogul .............. G06F 17/30902
                                                709/219
(Continued)

FOREIGN PATENT DOCUMENTS

JP  10-154101    6/1998
JP  2000-250716  9/2000

OTHER PUBLICATIONS

A. Manzanres, X. Ruan, S. Yin, M. Nijim, W. Luo and X. Qin, "Energy-Aware Prefetching for Parallel Disk Systems: Algorithms, Models, and Evaluation," 2009 Eighth IEEE International Symposium on Network Computing and Applications, Cambridge, MA, 2009, pp. 90-97. doi: 10.1109/NCA.2009.29.*

(Continued)

*Primary Examiner* — Edward Dudek, Jr.
*Assistant Examiner* — Ralph A Verderamo, III
(74) *Attorney, Agent, or Firm* — Fujitsu Patent Center

(57) ABSTRACT

When a power-saving period registered in device management information is reached, a processor of a storage control apparatus sets an operation mode of the corresponding storage device to a power-saving mode. In addition, the processor deletes identification information of data stored in a storage device whose power-saving period is registered in the device management information, from data management information in which identification information of data that could be copied to a cache from at least one access-destination storage device asynchronously with access by the host apparatus is registered.

7 Claims, 15 Drawing Sheets

(52) U.S. Cl.
CPC ........ *G06F 3/0689* (2013.01); *G06F 12/0833* (2013.01); *G06F 2212/621* (2013.01); *Y02B 60/1246* (2013.01)

(56) References Cited

U.S. PATENT DOCUMENTS

| | | | | |
|---|---|---|---|---|
| 2007/0136534 A1* | 6/2007 | Mesard | ............... | G06F 9/30047 711/137 |
| 2009/0187715 A1* | 7/2009 | Sajayan | .............. | G06F 12/0862 711/137 |
| 2014/0325159 A1* | 10/2014 | Meredith | ............ | G06F 12/0862 711/135 |
| 2016/0019065 A1* | 1/2016 | Hayenga | ............... | G06F 9/3816 712/207 |

OTHER PUBLICATIONS

Qingbo Zhu, F. M. David, C. F. Devaraj, Zhenmin Li, Yuanyuan Zhou and Pei Cao, "Reducing Energy Consumption of Disk Storage Using Power-Aware Cache Management," Software, IEE Proceedings-, 2004, pp. 118-118. doi: 10.1109/HPCA.2004.10022.*

Papathanasiou, Athanasios E., and Michael L. Scott. "Energy efficient prefetching and caching." Proceedings of the 2004 USENIX Annual Technical Conference. 2004.*

J. P. Rybczynski, D. D. E. Long and A. Amer, "Adapting Predictions and Workloads for Power Management," 14th IEEE International Symposium on Modeling, Analysis, and Simulation, 2006, pp. 3-12. doi: 10.1109/MASCOTS.2006.10.*

* cited by examiner

STORAGE CONTROL APPARATUS AND COMPUTER-READABLE RECORDING MEDIUM STORING PROGRAM FOR REMOVING PREFETCHES TO STORAGE DEVICES CURRENTLY IN POWER-SAVING MODE

CROSS-REFERENCE TO RELATED APPLICATION

This application is based upon and claims the benefit of priority of the prior Japanese Patent Application No. 2015-006232, filed on Jan. 15, 2015, the entire contents of which are incorporated herein by reference.

FIELD

The embodiments discussed herein relate to a storage control apparatus and a computer-readable recording medium storing a program.

BACKGROUND

In recent years, to reduce power consumption, various apparatuses have been provided with a power-saving function. For example, there are storage apparatuses that have a function of setting hard disk drives (HDDs) in a power-saving mode for a predetermined period. For example, when an HDD is set in a power-saving mode, rotation of its magnetic disks is stopped. In this way, the power consumption of the storage apparatus can be reduced.

An information processing apparatus has been proposed as an example of power-saving technology. When setting an HDD in a power-saving mode, depending on the status or purpose of use, the information processing apparatus causes the HDD to forward predetermined data to a fixed-data area allocated in a memory that is not set in the power-saving mode.

See, for example, Japanese Laid-open Patent Publication No. 2000-250716

Among these storage apparatuses, each of which includes a plurality of storage devices and has a function of holding part of the data stored in these storage devices in a cache, there are storage apparatuses, each of which has a function of staging data from a storage device to a cache asynchronously with access to the data by a host apparatus. This staging processing is a kind of processing for prefetching data to a cache. If such storage apparatus as described above is provided with a function of setting a storage device in a power-saving mode for a predetermined period, the following problem could arise.

While a certain storage device is in a power-saving mode, if prefetching data stored in the storage device to a cache is performed, the power-saving mode of the storage device is canceled. In many cases, a period in which a storage device is set in a power-saving mode is a period in which the data stored in the storage device is less likely to be accessed by a host apparatus. Thus, even if the data is prefetched to a cache, the prefetched data is less likely to be accessed by the host apparatus immediately. In this sense, even if the data is prefetched in this period, the access response performance is improved very little. Therefore, if execution of a data prefetch operation is requested on a storage device in a power-saving mode, although the storage device is in a period in which the power-saving mode does not probably need to be canceled, the power-saving mode is canceled. Namely, there is a problem that unnecessary power could be consumed.

SUMMARY

According to one aspect, there is provided a storage control apparatus including: a memory that includes a cache; and a processor that performs a procedure including: controlling access by a host apparatus to a plurality of storage devices via the cache, referring to device management information in which identification information of an individual storage device that is operated in a power-saving mode among the plurality of storage devices is associated with a power-saving period in which the corresponding storage device is operated in the power-saving mode and setting, when any one of the power-saving periods registered in the device management information is reached, an operation mode of the storage device whose power-saving period has been reached to the power-saving mode, and deleting identification information of data stored in a storage device whose power-saving period is registered in the device management information, from data management information in which identification information of data that could be copied to the cache from at least one of the plurality of storage devices asynchronously with access by the host apparatus is registered.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments will be described with reference to the drawings.

First Embodiment

Figure 1:
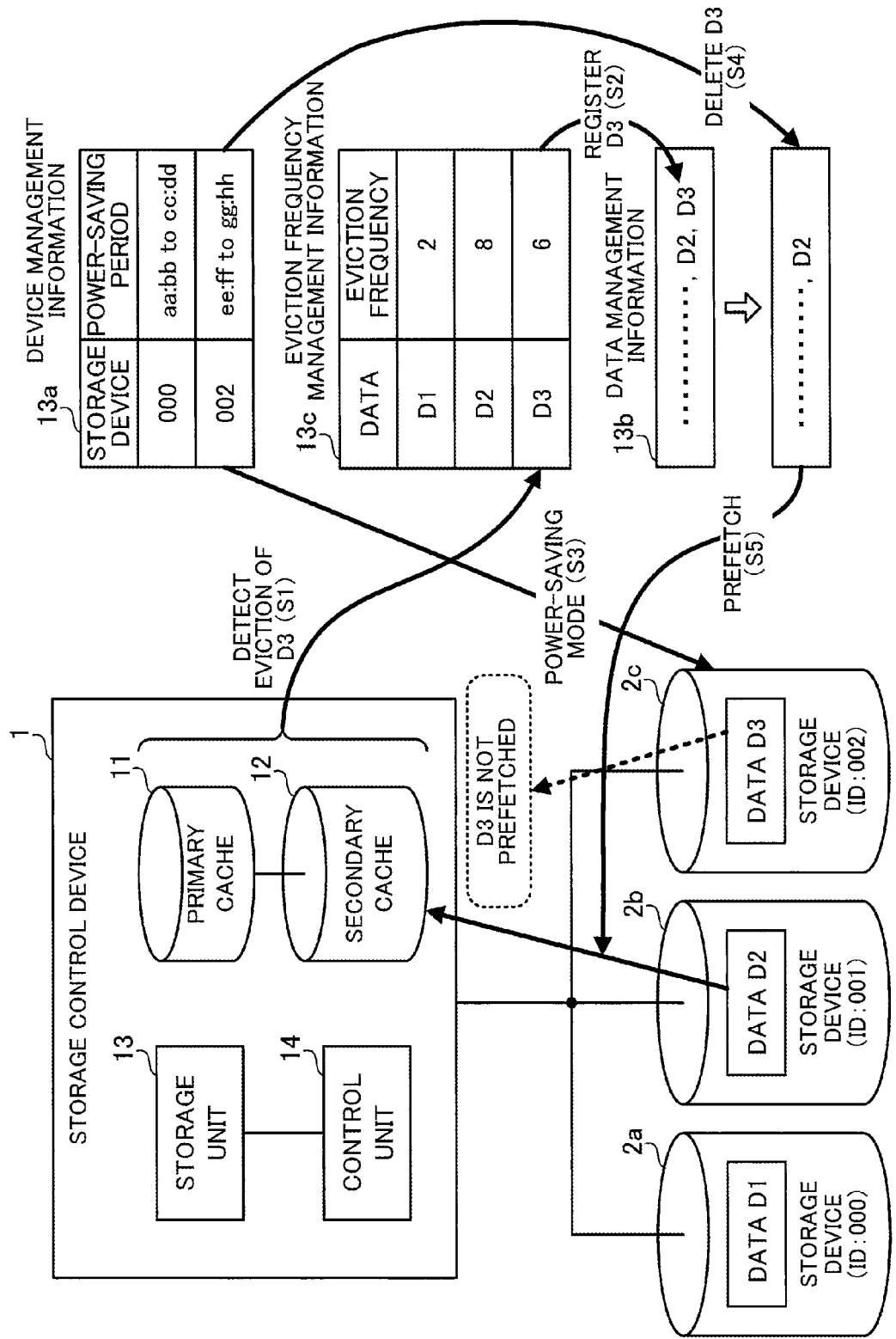
FIG. 1 illustrates a storage apparatus according to a first embodiment.

FIG. 1 illustrates a storage apparatus according to a first embodiment. The storage apparatus includes a storage control device 1 and a plurality of storage devices. In FIG. 1, as an example, the storage apparatus includes three storage devices 2a to 2c.

When a host apparatus (not illustrated) requests access to data stored in the storage devices 2a to 2c, the storage control device 1 controls the access. The storage control device 1 includes a cache used for this access control and controls the access by the host apparatus to the storage devices 2a to 2c via the cache. The storage area of the cache is realized by a storage device having a higher access speed than that of the storage devices 2a to 2c.

In FIG. 1, as an example, the cache includes a primary cache 11 and a secondary cache 12. With this configuration, the primary cache 11 exchanges data with the host apparatus, and the secondary cache 12 exchanges data between the primary cache 11 and the storage devices 2a to 2c. The storage control device 1 controls access by the host apparatus to the storage devices 2a to 2c via the primary cache 11 and the secondary cache 12.

The storage area of the primary cache 11 is realized by a storage device having a higher access speed than that of the storage device that realizes the storage area of the secondary cache 12. In addition, the storage area of the secondary cache 12 is realized by a storage device having a higher access speed than that of the storage devices 2a to 2c.

The storage control device 1 includes a storage unit 13 and a control unit 14. The storage unit 13 may be a volatile storage device such as a random access memory (RAM) or a non-volatile storage device such as an HDD or a flash memory. For example, the control unit 14 is a processor. Examples of the processor includes a central processing unit (CPU), a digital signal processor (DSP), an application specific integrated circuit (ASIC), and a field programmable gate array (FPGA). The control unit 14 may be a multiprocessor.

The storage unit 13 holds device management information 13a. In the device management information 13a, identification information such as an identifier (an ID) of an individual storage device that is operated in a power-saving mode among the storage devices 2a to 2c is associated with a power-saving period in which the corresponding storage device is operated in the power-saving mode. In the device management information 13a, a power-saving period may be registered per a plurality of storage devices, instead of per storage device. For example, in the device management information 13a, a power-saving period may be registered per RAID (Redundant Arrays of Inexpensive Disks) group to which a plurality of storage devices belong.

As an example of information used for processing performed by the control unit 14, data management information 13b is stored in the storage control device 1. The data management information 13b may be stored in the storage unit 13. In the data management information 13b, identification information of data that could be prefetched is registered, among the data stored in the storage devices 2a to 2c. This prefetch processing is processing for copying data stored in any one of the storage devices 2a to 2c to a cache asynchronously with access by the host apparatus to the data. When the host apparatus requests reading data that has been copied to the cache by the prefetch processing, the storage control device 1 reads the data from the cache, not from the corresponding one of the storage devices 2a to 2c. In this way, the response time to the read request is shortened.

When any one of the power-saving periods registered in the device management information 13a is reached, the control unit 14 sets an operation mode of the storage device whose power-saving period has been reached to the power-saving mode. When a storage device is set in the power-saving mode, the storage device consumes less power than it does during data access processing. For example, if the storage devices 2a to 2c are HDDs and are set in the power-saving mode, the storage devices 2a to 2c at least stop rotation of their own magnetic disks.

In addition, the control unit 14 deletes identification information of data stored in a storage device whose power-saving period is registered in the device management information 13a from the data management information 13b. The data deleted from the data management information 13b is not prefetched to the cache from the corresponding storage device.

In many cases, periods in which access requests are less likely to be transmitted from the host apparatus are set as power-saving periods in the device management information 13a. Thus, even if prefetching data in a certain storage device to the cache is performed while the storage device is set in the power-saving mode on the basis of the device management information 13a, it is less likely that the host apparatus transmits a request for access to the data immediately. In this sense, even if the data is prefetched in this period, the access response speed is improved very little.

In view of this, as described above, the control unit 14 deletes data stored in a storage device whose power-saving period is set in the device management information 13a from the data management information 13b. In this way, the storage control device 1 is prevented from accessing a storage device in the power-saving mode in order to prefetch data that is less likely to be accessed by the host apparatus immediately. Namely, since the storage devices are not shifted from the power-saving mode when the shifting is not very necessary, the power consumed by the storage devices is reduced accordingly. As a result, the power consumption of the storage apparatus is reduced. In addition, since data that is not attributable to sufficient improvement of the access response speed is not stored in the cache, the use efficiency of the cache is improved.

Next, a specific example of processing performed by the control unit 14 will be described. The following description will be made assuming that the storage control device 1 includes the primary cache 11 and the secondary cache 12 as illustrated in FIG. 1. In addition, the storage devices 2a, 2b, and 2c have IDs 000, 001, and 002, respectively. In addition, data D1, D2, and D3 are stored in the storage devices 2a, 2b, and 2c, respectively. In the device management information 13a, a power-saving period of the storage device 2a whose ID is 000 and a power-saving period of the storage device 2c whose ID is 002 are registered.

In addition, as an example, identification information of data that has been evicted from the primary cache 11 more than a predetermined times, namely, identification information of data whose eviction frequency is over a predetermined threshold, is registered in the data management information 13b. Prefetch processing based on the eviction frequency is performed since data having a higher eviction frequency is more likely to be accessed by the host apparatus again at some time in the future. Eviction frequency management information 13c for managing the eviction frequencies is stored in a storage device of the storage control device 1. The eviction frequency management information 13c may be stored in the storage unit 13. The eviction frequency of data may represent the number of times that the data has been evicted from the secondary cache 12, instead of the number of times that the data has been evicted from the primary cache 11.

The control unit 14 monitors data that has been evicted from the primary cache 11. When data is evicted, the control unit 14 increments the eviction frequency of the data in the eviction frequency management information 13c. Next, a specific operation will be described. First, the control unit 14 detects eviction of the data D3 from the primary cache 11 (step S1). Accordingly, the control unit 14 increments the eviction frequency of the data D3 to "6," which is over a predetermined threshold "5." Thus, the control unit 14 registers the identification information of the data D3 in the data management information 13b (step S2). As illustrated in FIG. 1, the identification information of the data D2 has already been registered in the data management information 13b.

For example, at regular time intervals, the control unit 14 determines whether any of the power-saving periods registered in the device management information 13a has been reached. Assuming that the control unit 14 determines that the power-saving period of the storage device 2c whose ID is 002 has been reached, the control unit 14 sets the storage device 2c in the power-saving mode (step S3).

In addition, for example, at regular time intervals, the control unit 14 deletes data stored in a storage device whose power-saving period is registered in the device management information 13a from the data management information 13b. The data D3 registered in the data management information 13b is stored in the storage device 2c whose power-saving period is registered in the device management information 13a. Thus, after registering the data D3 in the data management information 13b in step S2, the control unit 14 deletes the data D3 from the data management information 13b (step S4).

In addition, for example, at regular time intervals, the control unit 14 refers to the data management information 13b and prefetches data registered in the data management information 13b to the secondary cache 12 from the corresponding one of the storage devices 2a to 2c.

When the control unit 14 refers to the data management information 13b after performing step S4, the control unit 14 prefetches the data D2 registered in the data management information 13b to the secondary cache 12 from the storage device 2b (step S5). Since the data D3 has already been deleted from the data management information 13b in step S4, the data D3 is not prefetched from the storage device 2c to the secondary cache 12. Thus, the storage device 2c is maintained in the power-saving mode.

As described above, in many cases, periods in which access requests are less likely to be transmitted from the host apparatus are set as the power-saving periods in the device management information 13a. Thus, as in step S5, even if data in the storage device 2c is prefetched to the secondary cache 12 while the storage device 2c is set in the power-saving mode on the basis of the device management information 13a, it is less likely that the host apparatus transmits a request for access to the data immediately. In this sense, even if the data in the storage device 2c is prefetched in this period, the access response speed is improved very little.

In view of this, as described above, the control unit 14 deletes the data D3 stored in the storage device 2c whose power-saving period is set in the device management information 13a from the data management information 13b. In this way, the storage control device 1 is prevented from accessing the storage device 2c in the power-saving mode in order to prefetch the data D3 that is less likely to be accessed by the host apparatus immediately. Namely, since the storage device 2c is not shifted from the power-saving mode when the shifting is not very necessary, the power consumed by the storage device 2c is reduced accordingly. As a result, the power consumption of the storage apparatus is reduced. In addition, since data that is not attributable to sufficient improvement of the access response speed is not stored in the secondary cache 12, the use efficiency of the secondary cache 12 is improved.

Second Embodiment

Figure 2:
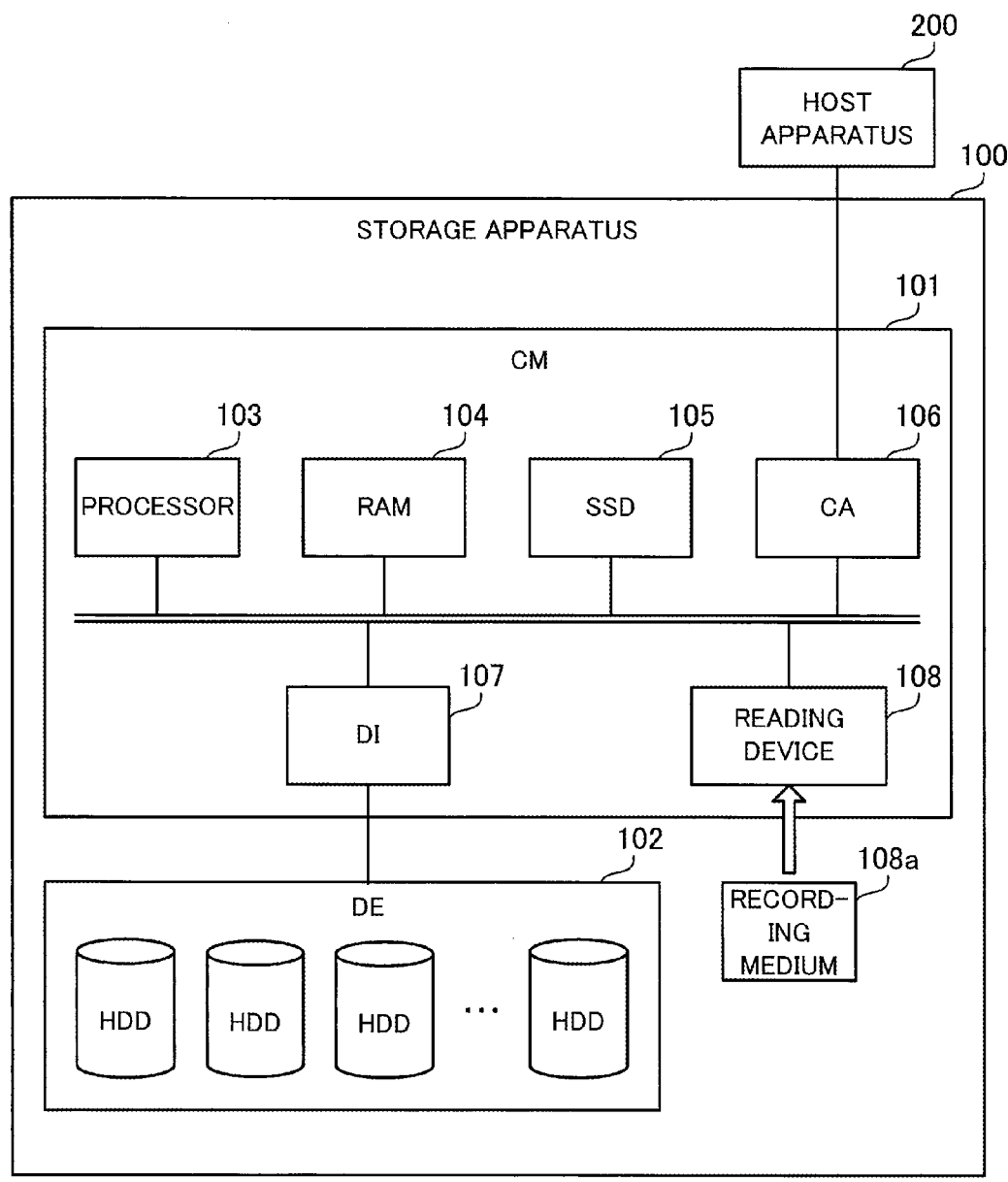
FIG. 2 illustrates an example of a hardware configuration of a storage apparatus according to a second embodiment.

FIG. 2 illustrates an example of a hardware configuration of a storage apparatus according to a second embodiment. A storage apparatus 100 and a host apparatus 200 are connected to each other via a serial attached SCSI (SAS) or a cable such as a fibre channel (FC). In addition, the storage apparatus 100 and the host apparatus 200 may be connected to each other via a storage area network (SAN) that uses an FC, an Internet small computer system interface (iSCSI), or the like.

The storage apparatus 100 includes a controller module (CM) 101 and a drive enclosure (DE) 102. The storage apparatus 100 may include a plurality of CMs. The storage apparatus 100 may include a plurality of DEs. For example, when the host apparatus 200 requests access to data in the DE 102, the CM 101 controls the access. The CM 101 also controls operations of the hardware modules in the storage apparatus 100.

The DE 102 includes a plurality of storage devices that can be accessed by the host apparatus 200. In this embodiment, as the storage devices, HDDs are included in the DE 102.

The CM 101 is an example of the storage control device 1 in FIG. 1, and the HDDs included in the DE 102 are examples of the storage devices 2a to 2c in FIG. 1.

The CM 101 includes a processor 103, a RAM 104, a solid state drive (SSD) 105, a channel adapter (CA) 106, a drive interface (DI) 107, and a reading device 108.

The processor 103 controls information processing of the CM 101. The processor 103 may be a multiprocessor including a plurality of processing elements.

The RAM 104 is a main storage device of the CM 101. The RAM 104 temporarily holds at least part of an operating system (OS) program or an application program executed by the processor 103. In addition, the RAM 104 holds various types of data used for processing performed by the processor 103.

The SSD 105 is an auxiliary storage apparatus of the CM 101 and is a non-volatile semiconductor memory. In the SSD 105, an OS program, an application program, and various types of data are stored. Instead of the SSD 105, the CM 101 may include an HDD as an auxiliary storage apparatus.

The CA 106 is an interface for communication with the host apparatus 200. The DI 107 is an interface for communication with the DE 102.

The reading device 108 reads a program or data recorded in a portable recording medium 108a. For example, a magnetic disk such as a flexible disk (FD) or an HDD, an optical disk such as a compact disc (CD) or a digital versatile disc (DVD), or a magneto-optical disk (MO) may be used as the recording medium 108a. In addition, for example, a non-volatile semiconductor memory such as a flash memory card may be used as the recording medium. For example, the reading device 108 transmits a program or data read from the recording medium 108a to the processor 103 in accordance with an instruction from the processor 103.

The storage area of each of the HDDs in the DE 102 is managed as a RAID element, for example. A group of HDDs to which a RAID technique is applied is managed in a unit referred to as a RAID group. At least one logical volume that could be accessed by the host apparatus 200 is set to a RAID group, and a logical unit number (LUN) is allocated to each logical volume. When performing access processing, the host apparatus 200 specifies a LUN and a logical block address (LBA) of a logical volume.

Figure 3:
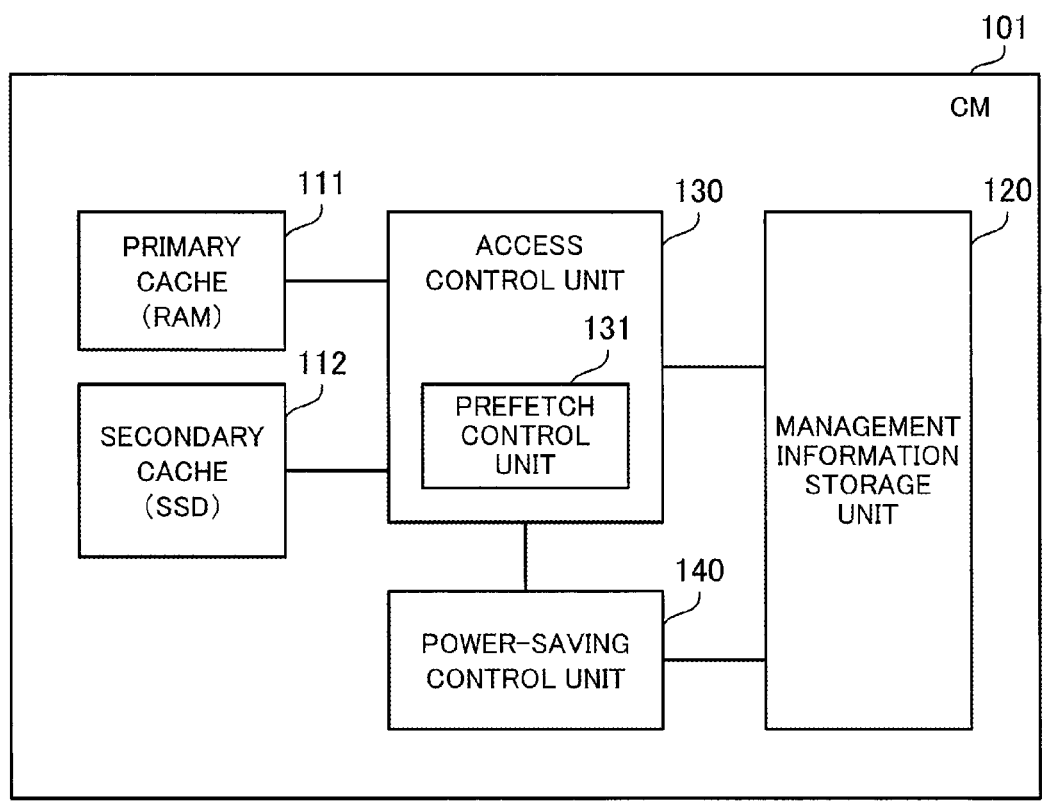
FIG. 3 illustrates examples of functions of a CM of the storage apparatus.

FIG. 3 illustrates examples of functions of the CM 101 of the storage apparatus 100. The CM 101 of the storage apparatus 100 includes a primary cache 111, a secondary cache 112, a management information storage unit 120, an access control unit 130, and a power-saving control unit 140.

The primary cache 111 and the secondary cache 112 are used as cache areas when the DE 102 is accessed in response to an access request from the host apparatus 200. The secondary cache 112 is implemented as a storage area allocated in a storage device whose access performance is higher than that of the storage devices (HDDs) in the DE 102. In this embodiment, the secondary cache 112 is implemented as a storage area allocated in the SSD 105. The SSD in which the storage area of the secondary cache 112 is allocated may be an SSD different from the SSD 105 used as an auxiliary storage apparatus of the CM 101. The primary cache 111 is implemented as a storage area allocated in a storage device whose access performance is higher than that of the storage device used as the secondary cache 112. In this embodiment, the primary cache 111 is implemented as a storage area allocated in the RAM 104.

For example, the management information storage unit 120 is implemented as a storage area allocated in the RAM 104 or the SSD 105. The management information storage unit 120 holds various kinds of management information used for processing performed by the access control unit 130, a prefetch control unit 131, and the power-saving control unit 140. For example, the management information storage unit 120 holds a RAID group table, a power-saving management table, a primary cache table, a secondary cache table, a count table, and a staging table.

In the RAID group table, information that defines RAID groups, such as information about HDDs that belong to an individual RAID group, is registered. In the power-saving management table, information about periods in which the power-saving mode is executed is registered. In the primary cache table, information about data stored in the primary cache 111 is registered. In the secondary cache table, information about data stored in the secondary cache 112 is registered. In the count table, per data, information indicating a number of times of eviction from the primary cache 111 is registered. In the staging table, information indicating data that could be prefetched is registered.

The management information storage unit 120 holds a threshold for determining the data that could be prefetched. The threshold indicates a number of times of eviction from the primary cache 111. For example, the threshold is 3.

For example, the processing performed by the access control unit 130 and the processing performed by the power-saving control unit 140 are realized by causing the processor 103 to execute predetermined programs, respectively.

The access control unit 130 controls access to an HDD in the DE 102 in response to an access request from the host apparatus 200. For example, when the access control unit 130 accesses an HDD in the DE 102 in response to an access request from the host apparatus 200, the access control unit 130 uses the primary cache 111 and the secondary cache 112. For example, the access control unit 130 performs cache control by using the primary cache 111 and the secondary cache 112 on the basis of Least Recently Used (LRU).

When the data requested by the host apparatus 200 is not stored in the primary cache 111 or the secondary cache 112, the access control unit 130 reads this data from a corresponding HDD in the DE 102. The access control unit 130 stores the read data in the primary cache 111 and the secondary cache 112 and transmits the read data to the host apparatus 200. In addition, when the data requested by the host apparatus 200 is not stored in the primary cache 111 but stored in the secondary cache 112, the access control unit 130 copies this data from the secondary cache 112 to the primary cache 111 and transmits the data to the host apparatus 200.

Hereinafter, as needed, processing for storing data read from an HDD in the DE 102 in the primary cache 111 and the secondary cache 112 and processing for copying data stored in the secondary cache 112 to the primary cache 111 will be referred to as "staging."

When the access control unit 130 stages data to the primary cache 111, if the primary cache 111 has no available space, the access control unit 130 evicts the least recently used data in the primary cache 111 from the primary cache 111. In this operation, the access control unit 130 increments the eviction frequency, which corresponds to the evicted data, in the count table. In addition, when the access control unit 130 stages data to the secondary cache 112, if the secondary cache 112 has no available space, the access control unit 130 evicts the least recently used data in the secondary cache 112 from the secondary cache 112.

In addition, the access control unit 130 manages HDDs in the DE 102 as RAID groups. For example, when the access control unit 130 reads data in a logical volume set as a RAID group from an HDD in the DE 102, the access control unit 130 refers to information that defines the RAID group registered in the RAID group table and determines the HDD and address from which the data is read.

In addition, the access control unit 130 includes the prefetch control unit 131. The prefetch control unit 131 refers to the count table and determines whether there is data that has been evicted from the primary cache 111 more than a predetermined number of times, namely, more than a predetermined threshold. If so, the prefetch control unit 131 registers a corresponding record in the staging table. In addition, the prefetch control unit 131 regularly refers to the staging table, selects a predetermined number of records from the top record in the staging table, and stages data corresponding to the selected records from the DE 102 to the secondary cache 112.

The staging of data on the basis of the staging table is a so-called "prefetch processing" that is performed asynchronously with an access request made by the host apparatus 200 to the data. Namely, data that has been evicted from a cache area more than a predetermined number of times is more likely to be staged to the cache area again in the future in response to an access request made by the host apparatus 200. Thus, the data is prefetched to the secondary cache 112. In this way, when the storage apparatus 100 subsequently receives an access request to the data from the host apparatus 200, the storage apparatus 100 is able to respond to the request more promptly.

The data staged on the basis of the staging table is less likely to be accessed by the host apparatus 200 within a short period of time after the data is staged. Thus, the execution priority of the staging based on the staging table is lower than, for example, that of the staging performed when a cache miss occurs with the primary cache 111 or the secondary cache 112. When the host apparatus 200 requests sequential access, data that could be accessed is also staged to the cache area. The execution priority of the staging based on the staging table is lower than that of the staging performed when the sequential access is detected.

In addition, the data prefetched by the prefetch control unit 131 may be staged not only to the secondary cache 112 but also to the primary cache 111. However, as described above, such data as described above is less likely to be accessed by the host apparatus 200 immediately. Thus, the prefetch control unit 131 stages the data only to the secondary cache 112. In this way, since data that is more likely to be accessed immediately remains in the primary cache 111, the use efficiency of the cache area is improved. Consequently, the overall access response performance is improved. In addition, generally, the capacity of the secondary cache 112 is larger than that of the primary cache 111. Thus, even if the data that is less likely to be accessed immediately, such as the data prefetched by the prefetch control unit 131, is stored in the secondary cache 112, the use efficiency of the cache area is not always deteriorated. Namely, since the data prefetched by the prefetch control unit 131 is staged only to the secondary cache 112, the use efficiency of the cache capacity and the access response performance are improved in a balanced manner.

The power-saving control unit 140 sets an operation mode of an individual HDD in the DE 102 to a normal mode or the power-saving mode, in accordance with the corresponding schedule set in the power-saving management table. When setting an HDD to the normal mode, the power-saving control unit 140 transmits a spin-up command to the HDD. In this way, the disks of the HDD start to rotate. If the power of the HDD is OFF, the power-saving control unit 140 may use a Wake-On-LAN (WOL) function to turn on the power of the HDD and rotate the disks of the HDD. Hereinafter, as needed, the normal mode will be referred to as a motor-ON mode.

Examples of the power-saving mode include a mode in which rotation of the disks of an HDD is stopped (a motor-OFF mode) and a mode in which the supply of power to an HDD is stopped (a power-OFF mode). When an HDD is in the motor-OFF mode, the HDD is provided with power but is set in a standby state. When setting an HDD in the motor-OFF mode, the power-saving control unit 140 transmits a spin-down command to the HDD. In this way, rotation of the disks of the HDD is stopped. In addition, when setting an HDD in the power-OFF mode, the power-saving control unit 140 transmits a power-OFF command to the HDD. In this way, the supply of power to the HDD is stopped.

A user sets a power-saving period in the power-saving management table per RAID group. When a power-saving period of a RAID group is reached, the HDDs that belong to the RAID group are set in the power-saving mode. For example, the user sets the HDDs that belong to a RAID group in the power-saving mode in a period in which a logical volume given to the RAID group is not accessed. In this way, the power consumed by these HDDs is reduced.

The following problems arise when the prefetch processing performed by the prefetch control unit 131 and the control processing performed by the power-saving control unit 140 are independently executed in a parallel manner. When prefetching data, the prefetch control unit 131 does not take into account the schedule of the power-saving mode of an HDD holding the data to be prefetched. Thus, even when the HDD holding the data to be prefetched is in the power-saving mode, there are cases in which the prefetch control unit 131 accesses this HDD to prefetch the data. As a result, the accessed HDD is automatically shifted from the power-saving mode to the normal mode.

As described above, when an HDD is in a power-saving period, the data in the HDD is less likely to be accessed by the host apparatus 200. However, since the prefetch control unit 131 shifts the HDD to the normal mode in order to prefetch requested data, the HDD consumes unnecessary power. In addition, since the HDD remains in the normal mode for a predetermined time period once shifted to the normal mode, the power consumption is increased. As described above, since an HDD that is less likely to be accessed is shifted to the normal mode, unnecessary power is consumed. Namely, there is a problem that the power consumption of the storage apparatus 100 is increased.

In addition, since the data that is less likely to be accessed by the host apparatus 200 is stored in the secondary cache 112 until a set period of the power-saving mode ends, there is a problem that the use efficiency of the secondary cache 112 is deteriorated.

To address these problems, in addition to the above processing, the power-saving control unit 140 requests the access control unit 130 to perform processing (nullification processing) that prevents the prefetch control unit 131 from prefetching the data in an HDD in the power-saving mode. At least, the nullification processing includes processing for deleting a record that corresponds to data in an HDD set in the power-saving mode from the staging table. In this way, since the prefetch control unit 131 is prevented from accessing an HDD set in the power-saving mode, the HDD does not consume unnecessary power. In addition, the use efficiency of the secondary cache 112 is improved.

In addition, the power-saving control unit 140 instructs the access control unit 130 to perform processing (increment processing) for facilitating the prefetch processing by the prefetch control unit 131 on the data in an HDD in the normal mode, compared with the data in the HDDs that belong to the RAID groups whose power-saving periods are scheduled in the power-saving management table. The increment processing is processing for incrementing the eviction frequency of the data stored in the HDD, the eviction frequency being stored in the count table.

Next, various kinds of management information stored in the management information storage unit 120 will be described.

Figure 4:
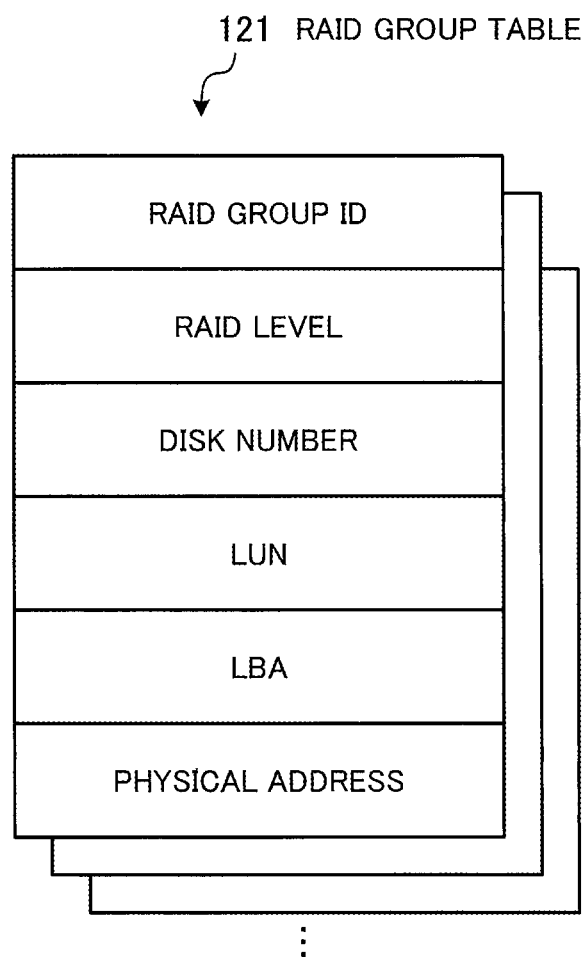
FIG. 4 illustrates an example of a RAID group table.

FIG. 4 illustrates an example of the RAID group table. A RAID group table 121 is stored in the management information storage unit 120. In the RAID group table 121, a record is created per RAID group. Each record includes sections for "RAID group ID," "RAID level," "disk number," "LUN," "LBA," and "physical address."

Hereinafter, a record for a RAID group will be described in detail. In the section for "RAID group ID," information that identifies the RAID group is registered. In the section for "RAID level," information indicating a RAID level of the RAID group is registered. Examples of the RAID level that is registered include RAID-1, RAID-4, and RAID-5. In the section for "disk number," disk numbers that identify the respective HDDs that belong to the RAID group are registered. In the section for "LUN," a LUN that identifies a logical volume set to the RAID group is registered. In the section for "LBA," an LBA at the end in the logical volume is registered, the LBA indicates a size of the logical volume. If a plurality of logical volumes are set to the RAID group, the number of combinations of a LUN and an LBA registered in the record is the same as the number of set logical volumes. In the section for "physical address," information indicating a physical storage area in the RAID group that corresponds to the LUN and LBA is registered.

Figure 5:
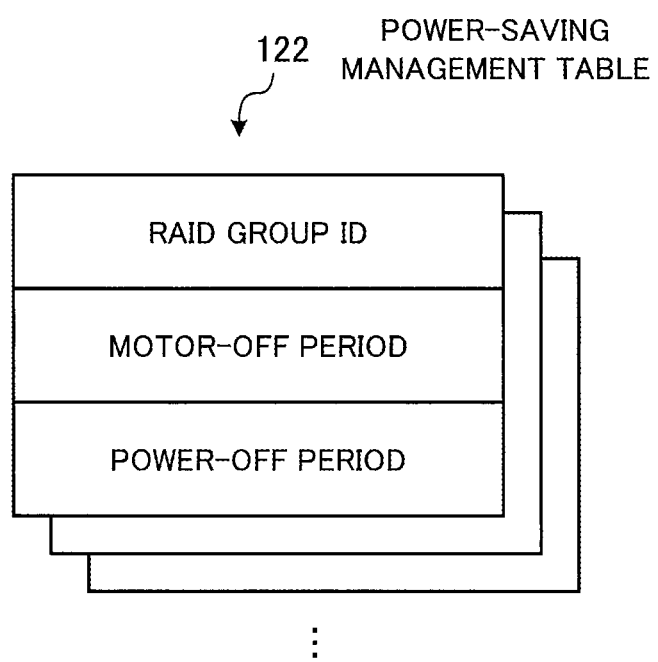
FIG. 5 illustrates an example of a power-saving management table.

FIG. 5 illustrates an example of the power-saving management table. A power-saving management table 122 is stored in the management information storage unit 120. In the power-saving management table 122, a record is created per RAID group whose power-saving mode is scheduled. Each record includes sections for "RAID group ID," "motor-OFF period," and "power-OFF period."

Hereinafter, a record for a RAID group will be described in detail. In the section for "RAID group ID," information that identifies the RAID group is registered. In the section for "motor-OFF period," a period in which the HDDs that belong to the RAID group are set in the motor-OFF mode is registered. In the section for "power-OFF period," a period in which the HDDs that belong to the RAID group are set in the power-OFF mode is registered. In each record, information is registered in either the section for "motor-OFF period" or "power-OFF period." If there are RAID groups that are not set in the power-saving mode, these RAID groups are not registered in the power-saving management table 122.

For example, the user sets information in the power-saving management table 122 by examining each RAID group and predicting a period in which the host apparatus 200 does not access the data in the HDDs that belong to the RAID group. Namely, the data in the HDDs that belong to a RAID group whose power-saving mode is scheduled (motor-OFF or power-OFF mode) is data that is not accessed until the motor-OFF period or the power-OFF period ends.

Figure 6:
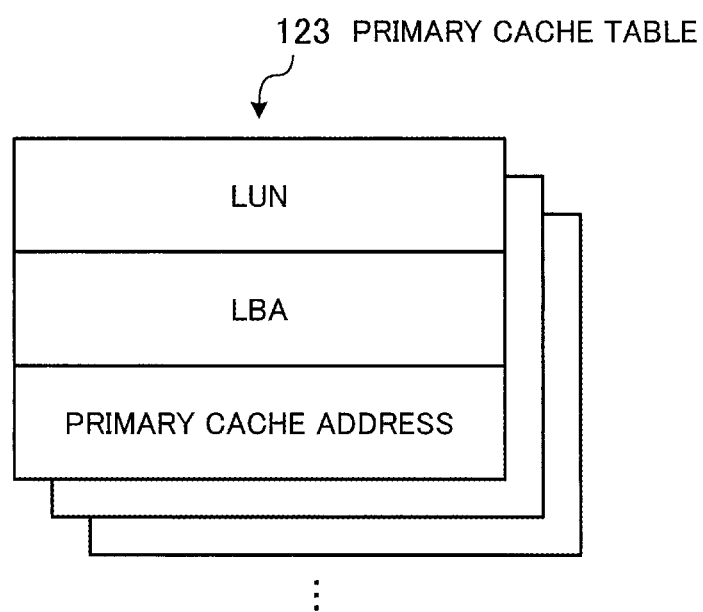
FIG. 6 illustrates an example of a primary cache table.

FIG. 6 illustrates an example of the primary cache table. A primary cache table 123 is stored in the management information storage unit 120. In the primary cache table 123, a record is created per data (block) stored in the primary cache 111. Each record includes sections for "LUN," "LBA," and "primary cache address."

Hereinafter, a record for data will be described in detail. In the section for "LUN," a LUN that indicates a logical volume to which the corresponding data belongs is registered. In the section for "LBA," an LBA of the corresponding data in the logical volume is registered. In the section for "primary cache address," an address that indicates the storage area of the corresponding data in the primary cache 111 is registered.

By referring to the primary cache table 123, the access control unit 130 determines whether the data identified from the LUN and the LBA is stored in the primary cache 111. In addition, by referring to the primary cache address, the access control unit 130 recognizes the location of the corresponding data in the primary cache 111.

In addition, the records in the primary cache table 123 are arranged in a certain order. When the host apparatus 200 requests access to data, the record that corresponds to the data is moved to the top in the primary cache table 123. Through this processing, a record that corresponds to the least recently used data is registered at the bottom in the primary cache table 123. Thus, the data that corresponds to the last record in the primary cache table 123 is the data that is evicted first from the primary cache 111.

Figure 7:
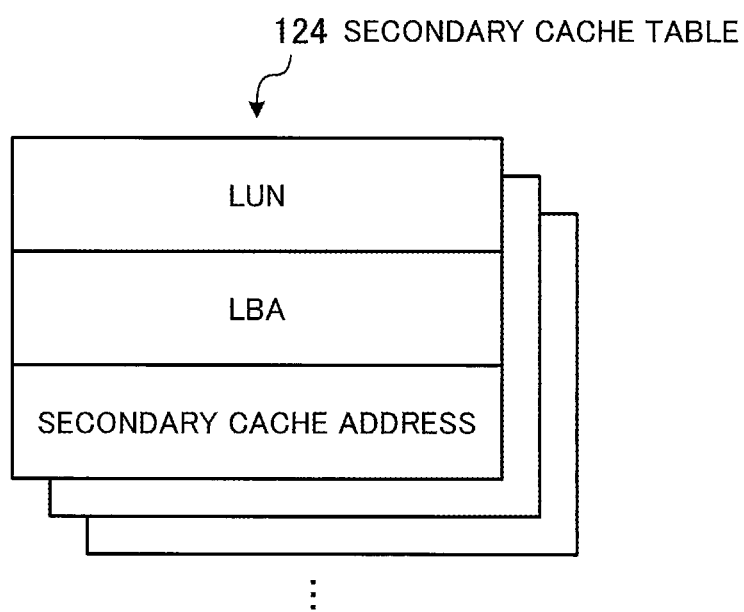
FIG. 7 illustrates an example of a secondary cache table.

FIG. 7 illustrates an example of the secondary cache table. A secondary cache table 124 is stored in the management information storage unit 120. In the secondary cache table 124, a record is created per data (block) stored in the secondary cache 112. Each record includes sections for "LUN," "LBA," and "secondary cache address."

Hereinafter, a record for data will be described in detail. In the section for "LUN," a LUN that indicates a logical volume to which the corresponding data belongs is registered. In the section for "LBA," an LBA of the corresponding data in the logical volume is registered. In the section "secondary cache address," an address that indicates the storage area of the corresponding data in the secondary cache 112 is registered.

By referring to the secondary cache table 124, the access control unit 130 determines whether the data identified by the LUN and the LBA is stored in the secondary cache 112. In addition, by referring to the secondary cache address, the access control unit 130 recognizes the location of the corresponding data in the secondary cache 112.

In addition, the records in the secondary cache table 124 are arranged in a certain order. When the host apparatus 200 requests access to data, the record that corresponds to the data is moved to the top in the secondary cache table 124. Through this processing, a record that corresponds to the least recently used data is registered at the bottom in the secondary cache table 124. Thus, the data that corresponds to the last record in the secondary cache table 124 is the data that is evicted first from the secondary cache 112.

If write control is performed by using a write-back method, a section for "status" is added to each record in the primary cache table 123 and the secondary cache table 124. In the section for "status," status information indicating whether data updated in a corresponding cache area has already been reflected in a corresponding lower-layer storage area is registered.

Figure 8:
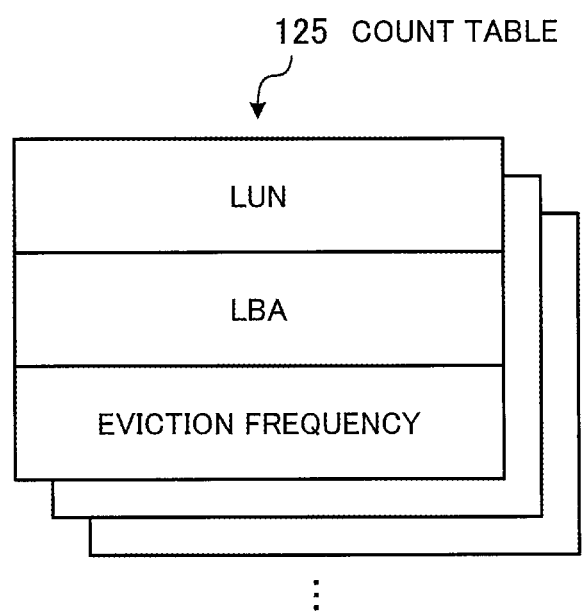
FIG. 8 illustrates an example of a count table.

FIG. 8 illustrates an example of the count table. A count table 125 is stored in the management information storage unit 120. In the count table 125, a record is created per data (block) that has ever been stored before in the cache area. Each record includes sections for "LUN," "LBA," and "eviction frequency."

Next, a record for data will be described in detail. In the section for "LUN," a LUN that indicates a logical volume to which the corresponding data belongs is registered. In the section for "LBA," an LBA of the corresponding data in the logical volume is registered. In the section for "eviction frequency," the number of times that the data identified by the LUN and the LBA has been evicted from the primary cache 111 is registered.

When evicting (destaging) data from the primary cache 111, the access control unit 130 determines whether a record that corresponds to the data is registered in the count table 125. If a record that corresponds to the data is not registered, the access control unit 130 adds a record that corresponds to the data in the count table 125. In addition to registering the LUN and LBA of the data in the added record, the access control unit 130 registers an initial value "1" in the section for "eviction frequency" in the added record. If a record that corresponds to the data has already been registered in the count table 125, the access control unit 130 increments the eviction frequency in the record.

Figure 9:
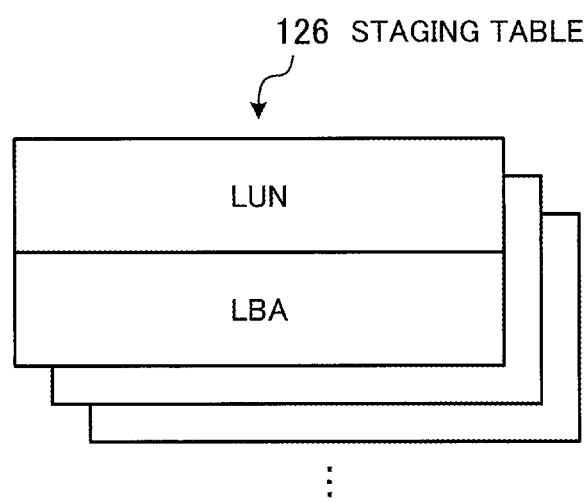
FIG. 9 illustrates an example of a staging table.

FIG. 9 illustrates an example of the staging table. A staging table 126 is stored in the management information storage unit 120. In the staging table 126, a record is registered per data (block). Each record includes sections for "LUN" and "LBA." Hereinafter, a record for data will be described in detail. In the section for "LUN," a LUN that indicates a logical volume to which the corresponding data belongs is registered. In the section for "LBA," an LBA of the corresponding data in the logical volume is registered.

The data identified by a LUN and an LBA registered in the staging table 126 is data that could be prefetched by the prefetch control unit 131. In addition, the records in the staging table 126 are arranged in a certain order, and the data that corresponds to the top record is the most preferentially prefetched data.

Figure 10A:
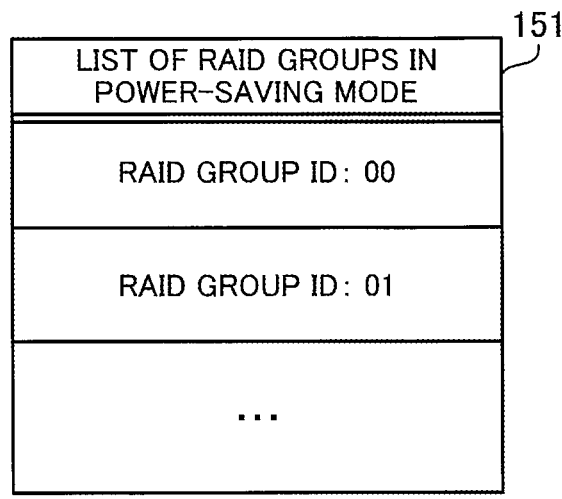
FIGS. 10A and 10B illustrate information referred to when execution of nullification processing and increment processing are requested, respectively.
Figure 10B:
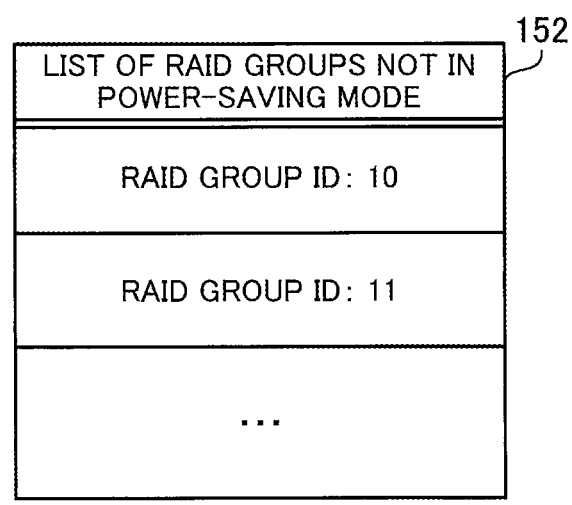

FIGS. 10A and 10B illustrate information referred to when execution of the nullification processing and the increment processing are requested, respectively. By referring to the power-saving management table 122, the power-saving control unit 140 determines whether an individual RAID group is set in the power-saving mode. The power-saving control unit 140 generates lists that indicate the determination result.

FIG. 10A illustrates an example of a list 151 of RAID groups that are in a power-saving mode, the list 151 generated by the power-saving control unit 140. IDs of the RAID groups that are set in the motor OFF mode or the power OFF mode are registered in the list 151. On the basis of the list 151, the power-saving control unit 140 requests the access control unit 130 to perform the nullification processing.

FIG. 10B is an example of a list 152 of RAID groups that are not set in the power-saving mode, the list 152 generated by the power-saving control unit 140. IDs of the RAID groups that are not set in the power-saving mode (namely, the RAID groups that are in the normal mode) are recorded in the list 152. On the basis of the list 152, the power-saving control unit 140 requests the access control unit 130 to perform the increment processing.

While not illustrated, for those HDDs that do not belong to any RAID groups, a list similar to the list 152 is generated by the power-saving control unit 140. For these HDDs, instead of the RAID group IDs, the corresponding disk numbers are recorded in the list.

Figure 11:
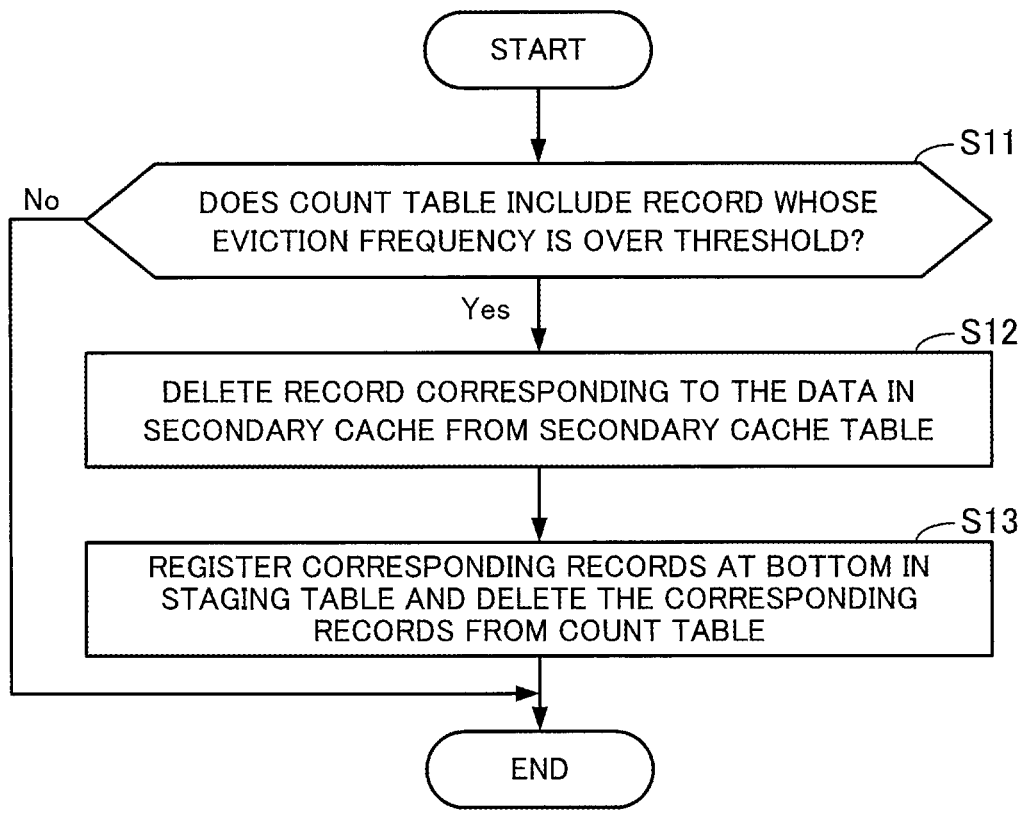
FIG. 11 is a flowchart illustrating an example of processing for registering a record in the staging table.

FIG. 11 is a flowchart illustrating an example of processing for registering a record in the staging table. Hereinafter, the processing in FIG. 11 will be described with step numbers. The prefetch control unit 131 regularly performs the processing in FIG. 11. For example, the prefetch control unit 131 performs the processing in FIG. 11 at intervals of 30 seconds.

(S11) The prefetch control unit 131 refers to the count table 125 and determines whether the count table 125 includes a record whose eviction frequency is over a predetermined threshold. If so, the processing proceeds to step S12. If not, the processing proceeds to END.

(S12) The prefetch control unit 131 refers to the secondary cache table 124 and deletes a record indicating that the corresponding data is stored in the secondary cache 112 from the secondary cache table 124 on the basis of the record whose eviction frequency is determined to be over the threshold in step S11.

(S13) The prefetch control unit 131 registers the remaining records including the corresponding LUNs and LBAs at the bottom in the staging table 126. In addition, the prefetch control unit 131 deletes the corresponding records from the count table 125. Instead of deleting the corresponding records from the count table 125, the prefetch control unit 131 may reset the eviction frequencies of the corresponding records in the count table 125 to 0.

Figure 12:
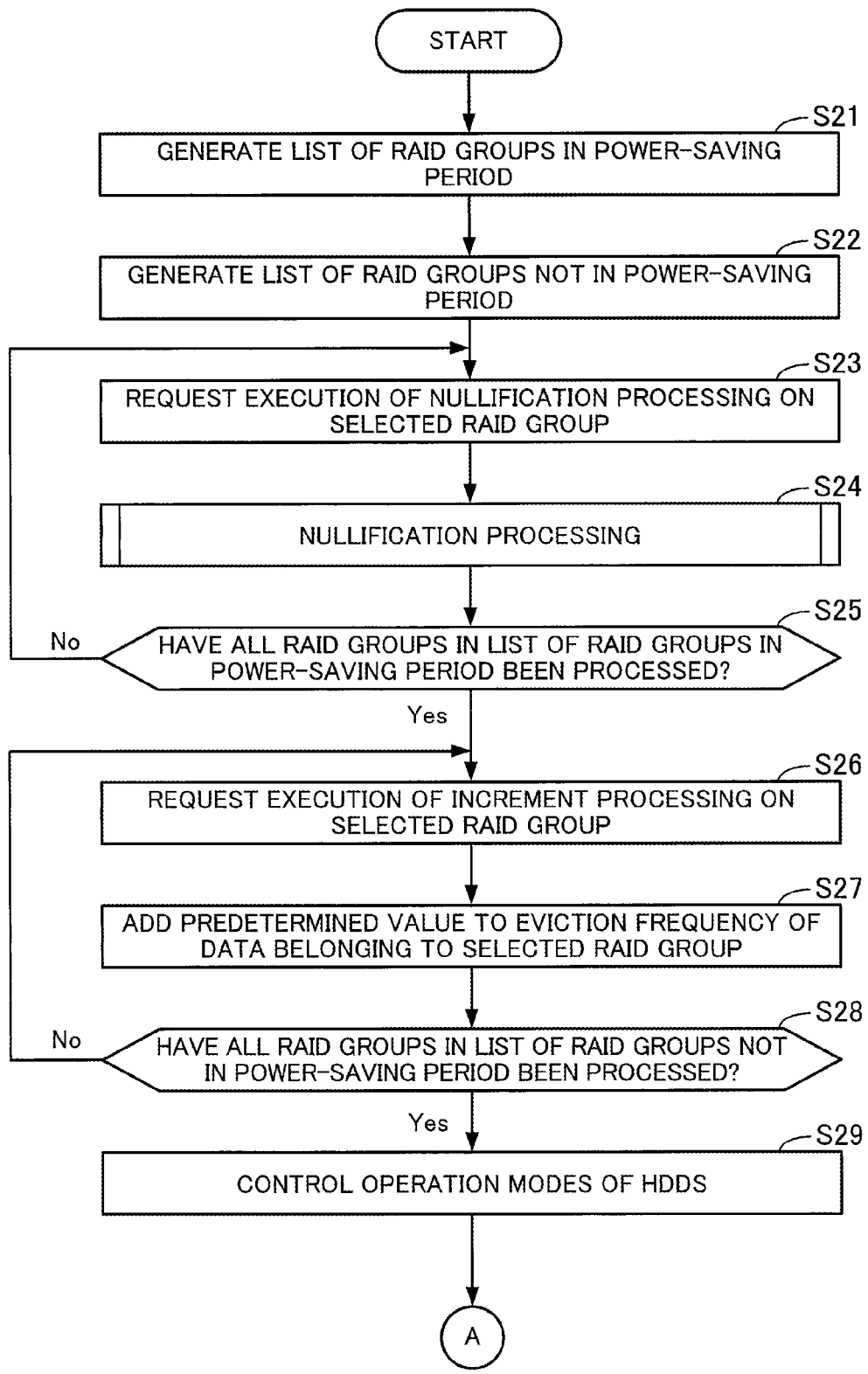
FIG. 12 is a part of a flowchart illustrating an example of power-saving control processing.

FIG. 12 is a part of a flowchart illustrating an example of power-saving control processing. Hereinafter, the processing in FIG. 12 will be described with step numbers. The power-saving control unit 140 regularly performs the processing in FIG. 12. For example, the power-saving control unit 140 performs the processing in FIG. 12 at intervals of 30 seconds.

(S21) The power-saving control unit 140 refers to the motor-OFF and power-OFF periods in the power-saving management table 122 and determines whether any of the power-saving periods of the RAID groups has been reached. Next, the power-saving control unit 140 generates the list 151 of RAID groups that are set in the power-saving period.

(S22) On the basis of the determination result in step S21, the power-saving control unit 140 generates the list 152 of RAID groups that are not set in the power-saving period.

(S23) The power-saving control unit 140 selects one RAID group from the list 151. The power-saving control unit 140 notifies the access control unit 130 of the ID of the selected RAID group and requests the access control unit 130 to perform the nullification processing on the RAID group.

(S24) In response to the request in step S23, the access control unit 130 performs the nullification processing on the data included in the logical volume set to the selected RAID group. The nullification processing will be described below with reference to FIG. 14. After the nullification processing, the access control unit 130 notifies the power-saving control unit 140 of completion of the nullification processing.

(S25) The power-saving control unit 140 determines whether all the RAID groups recorded in the list 151 have been processed. If so, the processing proceeds to step S26. If not, the processing returns to step S23.

(S26) The power-saving control unit 140 selects one RAID group from the list 152. The power-saving control unit 140 notifies the access control unit 130 of the ID of the selected RAID group and requests the access control unit 130 to perform the increment processing on the RAID group.

(S27) The access control unit 130 refers to the count table 125 and adds a predetermined value to the eviction frequency of the data included in the logical volume set to the RAID group selected in step S26. Specifically, the access control unit 130 refers to the RAID group table 121 and identifies the LUN of the logical volume set to the RAID group selected in step S26. The access control unit 130 determines whether the count table 125 includes a record in which the identified LUN is registered. If so, the access control unit 130 adds a predetermined value to the eviction frequency in the record. After this increment processing, the access control unit 130 notifies the power-saving control unit 140 of completion of the increment processing.

(S28) The power-saving control unit 140 determines whether all the RAID groups recorded in the list 152 have been processed. If so, the processing proceeds to step S29. If not, the processing returns to step S26.

(S29) The power-saving control unit 140 performs processing for controlling the operation modes of the HDDs on the basis of the respective schedules set in the power-saving management table 122. Specifically, the power-saving control unit 140 performs the following processing.

By referring to the power-saving management table 122, the power-saving control unit 140 identifies a RAID group whose power-saving period (motor-OFF mode) has been reached. By referring to the RAID group table 121, the power-saving control unit 140 identifies the HDDs that belong to the identified RAID group and transmits a spin-down command to the identified HDDs. In this way, rotation of the disks of the HDDs that belong to the RAID group in the motor-OFF mode is stopped. The power-saving control unit 140 does not necessarily transmit a spin-down command to HDDs that are already in the motor-OFF mode.

In addition, by referring to the power-saving management table 122, the power-saving control unit 140 identifies a RAID group whose power-saving period (power-OFF mode) has been reached. By referring to the RAID group table 121, the power-saving control unit 140 identifies the HDDs that belong to the identified RAID group and transmits a power-OFF command to the identified HDDs. In this way, the supply of power to the HDDs that belong to the RAID group in the power-OFF mode is stopped. The power-saving control unit 140 does not necessarily transmit a power-OFF command to HDDs that are already in the power-OFF mode.

In addition, by referring to the power-saving management table 122, the power-saving control unit 140 identifies a RAID group whose power-saving period (neither the motor-OFF nor power-OFF mode) has not been reached (namely, a RAID group in the normal mode). By referring to the RAID group table 121, the power-saving control unit 140 identifies the HDDs that belong to the identified RAID group and transmits a spin-up command to the identified HDDs. In this way, the HDDs in the motor-OFF or power-OFF mode are shifted to the normal mode. The power-saving control unit 140 does not necessarily transmit a spin-up command to those HDDs that are already in the normal mode.

Figure 13:
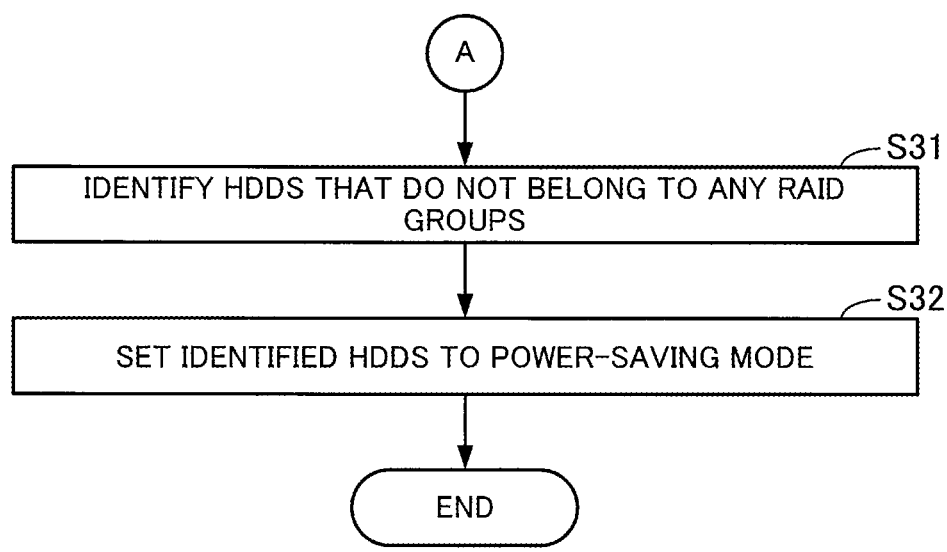
FIG. 13 is the remaining part of the flowchart in FIG. 12.

Next, the processing proceeds to step S31 in FIG. 13. FIG. 13 is the remaining part of the flowchart in FIG. 12. Hereinafter, the processing in FIG. 13 will be described with step numbers.

(S31) The power-saving control unit 140 identifies the HDDs that do not belong to any RAID groups among the HDDs included in the DE 102.

(S32) The HDDs that do not belong to any RAID groups are not accessed by the host apparatus 200. Thus, the power-saving control unit 140 sets the HDDs identified in step S31 to the power-saving mode. For example, the power-saving control unit 140 transmits a power-OFF command to the HDDs identified in step S31. Next, the processing proceeds to END.

Figure 14:
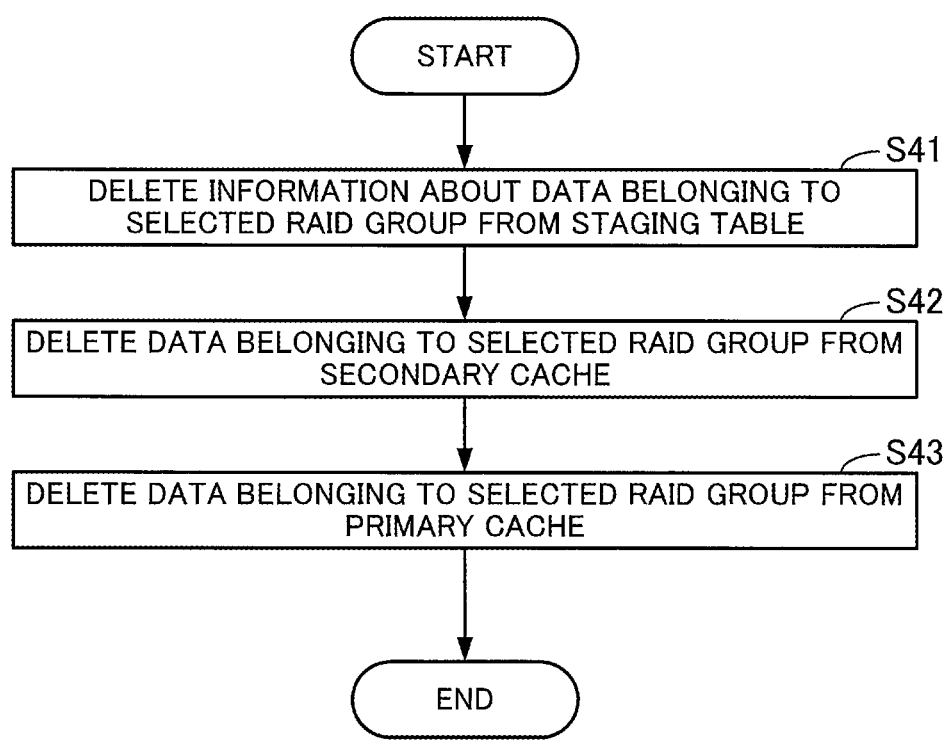
FIG. 14 is a flowchart illustrating an example of the nullification processing.

FIG. 14 is a flowchart illustrating an example of the nullification processing. Hereinafter the processing in FIG. 14 will be described with step numbers. The processing in FIG. 14 corresponds to step S24 in FIG. 12.

(S41) If the staging table 126 includes information about the data belonging to the RAID group selected in step S23, the prefetch control unit 131 in the access control unit 130 deletes the information.

Specifically, the prefetch control unit 131 refers to the RAID group table 121 and identifies the LUN of the logical volume set to the selected RAID group. The prefetch control unit 131 refers to the staging table 126, identifies a record including the identified LUN, and deletes the identified record from the staging table 126. In this way, the prefetch control unit 131 is prevented from prefetching the data stored in the HDDs that belong to the RAID group whose power-saving period is registered in the power-saving management table 122 and that has been shifted to the power-saving mode.

(S42) If the secondary cache 112 includes the data belonging to the RAID group selected in step S23, the access control unit 130 nullifies the data.

Specifically, the access control unit 130 refers to the secondary cache table 124 and determines whether the secondary cache table 124 includes a record including the LUN identified in step S41. If so, the access control unit 130 deletes the record from the secondary cache table 124. In this way, the data corresponding to the record in the secondary cache 112 is nullified, and the area in which the data has been stored is made available.

(S43) If the primary cache 111 includes the data belonging to the RAID group selected in step S23, the access control unit 130 nullifies the data.

Specifically, the access control unit 130 refers to the primary cache table 123 and determines whether the primary cache table 123 includes a record including the LUN identified in step S41. If so, the access control unit 130 deletes the record from the primary cache table 123. In this way, the data corresponding to the record in the primary cache 111 is nullified, and the area in which the data has been stored is made available.

Step S43 may be performed before step S42. However, it is preferable that step S41 be performed before steps S42 and S43. In this way, reading data from a corresponding HDD in a power-saving period is preferentially prevented, and the power consumption of the storage apparatus 100 is reduced without fail. In step S41 in the above processing in FIGS. 12 to 14, the record of the data stored in the HDDs that belong to the RAID group recorded in the list 151 is deleted from the staging table 126. In this way, the data stored in the HDDs in a power-saving mode is not prefetched by the prefetch control unit 131. Thus, the storage apparatus 100 does not access an HDD in the power-saving mode in order to prefetch data that is less likely to be accessed by the host apparatus 200 immediately. Namely, the power-saving mode is not canceled. As a result, the power consumption of the storage apparatus 100 is reduced.

In addition, in steps S42 and S43, the data stored in the HDDs that belong to the RAID group recorded in the list 151 is substantially deleted from the primary cache 111 and the secondary cache 112. In this way, since the data that is more likely to be accessed immediately is stored in the storage areas of the primary cache 111 and the secondary cache 112, both the use efficiency of the cache areas and the access response performance of the host apparatus 200 are improved.

In addition, in step S27, the eviction frequency of the data stored in the HDDs that belong to an individual RAID group recorded in the list 152 is increased. In this way, the data is more likely to be prefetched by the prefetch control unit 131. Since the data is stored in the HDDs in the normal mode, the data is more likely to be accessed by the host apparatus 200 immediately. Thus, by making the data more likely to be prefetched and by storing the data in the secondary cache 112 in advance, faster access processing is realized.

In addition, in step S32, the HDDs that do not belong to any RAID groups are set in the power-saving mode. The HDDs that do not belong to any RAID groups are not accessed by the host apparatus 200. Thus, by setting these HDDs in the power-saving mode, the power consumption of the storage apparatus 100 is reduced without deteriorating the access response performance.

Figure 15:
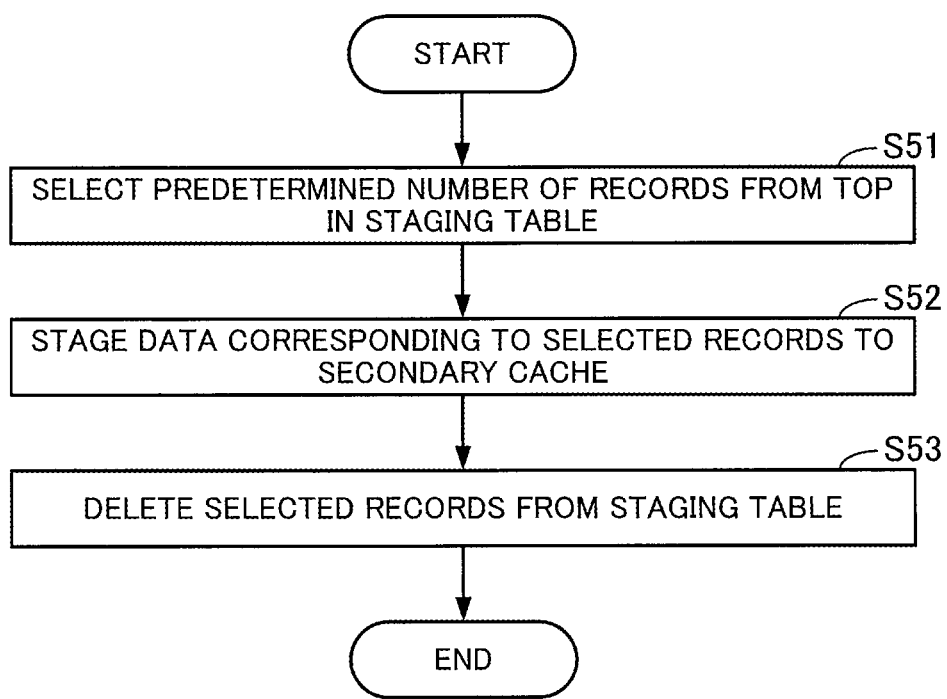
FIG. 15 is a flowchart illustrating an example of prefetch processing performed by a prefetch control unit.

FIG. 15 is a flowchart illustrating an example of prefetch processing performed by the prefetch control unit 131. Hereinafter, the processing illustrated in FIG. 15 will be described with step numbers. The prefetch control unit 131 regularly performs the processing illustrated in FIG. 15. For example, the prefetch control unit 131 performs the processing illustrated in FIG. 15 at intervals of 30 seconds. In addition, for example, the execution priority of the processing illustrated in FIG. 15 is lower than that of the staging to the primary cache 111 and the secondary cache 112 performed when a cache miss occurs. Thus, it is desirable that the processing illustrated in FIG. 15 be performed at least when staging in response to a cache miss is not requested.

(S51) The prefetch control unit 131 selects a predetermined number of records from the top record in the staging table 126.

(S52) The prefetch control unit 131 stages the data that corresponds to the records selected in step S51 to the secondary cache 112. Because of step S41 in FIG. 14, the records that correspond to the data stored in the HDDs in the power-saving mode have already been deleted from the staging table 126. Thus, in step S52, the HDDs in the power-saving mode are not accessed.

(S53) The prefetch control unit 131 deletes the records selected in step S51 from the staging table 126.

In the second embodiment, from the staging table 126, the power-saving control unit 140 deletes the records that correspond to the data in the HDDs that belong to the RAID groups in the power-saving mode, among the RAID groups whose power-saving periods are registered in the power-saving management table 122. However, alternatively, the power-saving control unit 140 may delete the records that correspond to the data in the HDDs that belong to the RAID groups whose power-saving periods are registered in the power-saving management table 122 from the staging table 126. However, in the former processing, when a RAID group is not in the power-saving mode, the corresponding data registered in the staging table 126 could be prefetched by the secondary cache 112. Thus, the access response performance is improved without increasing the power consumption of the HDDs. In addition, the above increment processing is allowed to be performed.

The information processing according to the first embodiment may be realized by causing a processor used in the storage control device 1 to execute a program. The information processing according to the second embodiment may be realized by causing the processor 103 to execute a program. These programs may be recorded in computer-readable recording media. For example, by distributing the recording media in which the programs are recorded, these programs may be distributed.

Programs that realize the functions that correspond to the access control unit 130 and the power-saving control unit 140, respectively, may be provided as separate programs, and these programs may be distributed separately. The functions of the access control unit 130 and the power-saving control unit 140 may be realized by separate computers. For example, a computer may store (install) these programs recorded in a recording medium in a storage device such as the RAM 104 or the SDD 105, read these programs from the storage device, and execute these programs. Each of the embodiments may be realized by combining a plurality of embodiments to the extent that does not cause inconsistency.

In one aspect, the power consumption is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
a memory that includes a cache; and
a processor that performs a procedure including:
controlling access by a host apparatus to a plurality of storage devices via the cache,
referring to device management information in which identification information of an individual storage device that is operated in a power-saving mode among the plurality of storage devices is associated with a power-saving period in which the corresponding storage device is operated in the power-saving mode and setting, when any one of the power-saving periods registered in the device management information is reached, an operation mode of the storage device whose power-saving period has been reached to the power-saving mode, and
deleting identification information of data stored in a storage device whose power-saving period is registered in the device management information, from data management information in which identification information of data that could be copied to the cache from at least one of the plurality of storage devices asynchronously with access by the host apparatus is registered.

2. The storage control apparatus according to claim 1, wherein the deleting includes deleting, from the data management information, identification information of data stored in a storage device whose power-saving period has been reached among the storage devices whose power-saving periods are registered in the device management information.

3. The storage control apparatus according to claim 1, wherein the cache includes a primary cache that exchanges data with the host apparatus and a secondary cache that exchanges data with the primary cache,
wherein the controlling includes controlling access by the host apparatus to the plurality of storage devices via the primary and secondary caches, and
wherein the procedure further includes
registering, when an eviction frequency of data stored in one of the plurality of storage devices exceeds a predetermined threshold, identification information of the data in the data management information, the eviction frequency indicating the number of times of eviction from the primary or secondary cache, and
copying data whose identification information is registered in the data management information to the secondary cache from a corresponding one of the plurality of storage devices asynchronously with access by the host apparatus to the data.

4. The storage control apparatus according to claim 3, wherein the procedure further includes incrementing, by a predetermined value, the eviction frequency of data stored in a storage device whose power-saving period has not been reached among the storage devices whose power-saving periods are registered in the device management information, the eviction frequency being referred to when registration of the data in the data management information is determined.

5. The storage control apparatus according to claim 1, wherein, after deleting the identification information of the data stored in the storage device whose power-saving period is registered in the device management information from the data management information, if the data is stored in the cache, the procedure further includes nullifying the data in the cache.

6. The storage control apparatus according to claim 1, wherein each of the plurality of storage devices is a hard disk drive, and wherein, when any one of the storage devices is set in the power-saving mode, the procedure further includes causing the storage device to at least stop rotation of a magnetic disk of the storage device.

7. A non-transitory computer-readable recording medium storing a computer program that causes a computer including a cache to perform a procedure comprising:

controlling access by a host apparatus to a plurality of storage devices via the cache, referring to device management information in which identification information of an individual storage device that is operated in a power-saving mode among the plurality of storage devices is associated with a power-saving period in which the corresponding storage device is operated in the power-saving mode and setting, when any one of the power-saving periods registered in the device management information is reached, an operation mode of the storage device whose power-saving period has been reached to the power-saving mode, and deleting identification information of data stored in a storage device whose power-saving period is registered in the device management information, from data management information in which identification information of data that could be copied to the cache from at least one of the plurality of storage devices asynchronously with access by the host apparatus is registered.

* * * * *